Oct. 24, 1933. T. W. ALLSWORTH ET AL 1,931,746

TRUCK MECHANISM

Filed Sept. 18, 1930 5 Sheets-Sheet 1

INVENTORS.
Terence W. Allsworth
Harvey Abbott
BY Lawrence Breder
Allen Allen
ATTORNEYS Oct. 24, 1933.  T. W. ALLSWORTH ET AL  1,931,746
TRUCK MECHANISM
Filed Sept. 18, 1930  5 Sheets-Sheet 3

Oct. 24, 1933.  T. W. ALLSWORTH ET AL  1,931,746
TRUCK MECHANISM
Filed Sept. 18, 1930   5 Sheets-Sheet 4

INVENTORS
Terrence W. Allsworth
Harvey Abbott
BY Lawrence Bruder
Allen P. Allen
ATTORNEYS Patented Oct. 24, 1933

1,931,746

UNITED STATES PATENT OFFICE 1,931,746

TRUCK MECHANISM

Terrence W. Allsworth and Harvey Abbott, Middletown, and Lawrence Bruder, Cincinnati, Ohio Application September 18, 1930
Serial No. 482,862

16 Claims. (Cl. 214—65)

Our invention is directed to trucks for shipping material and primarily to trucks for shipping very heavy pieces, packages, or assemblies of articles, such as have hitherto had to be rolled or skidded on to a truck, or piled and repiled because the combined load was too heavy for handling in any other manner. We will describe our invention in connection with a truck for the handling of sheet metal, by way of convenient illustration, it being understood that our invention is not restricted thereto, but can be used as readily in the shipment of other materials, and may be varied for different uses without departing from the spirit of our invention.

It is an object of our invention to provide a truck or the like for the shipment of heavy loads, which truck has means for receiving a load bodily and removing the load from a preliminary carrier.

It is an object of our invention to provide a truck or other platform carrier upon which a preliminary carrier holding a load may be placed, which will remove the load intact from the preliminary carrier, permitting the preliminary carrier to be taken away without disturbing the load.

The more specific objects of our invention will be fully apparent to one skilled in the art upon reading the ensuing specifications, wherein we have described the exemplary embodiment heretofore mentioned, reference being made to the drawings which form a part hereof.

In the drawings:—

Figure 1:
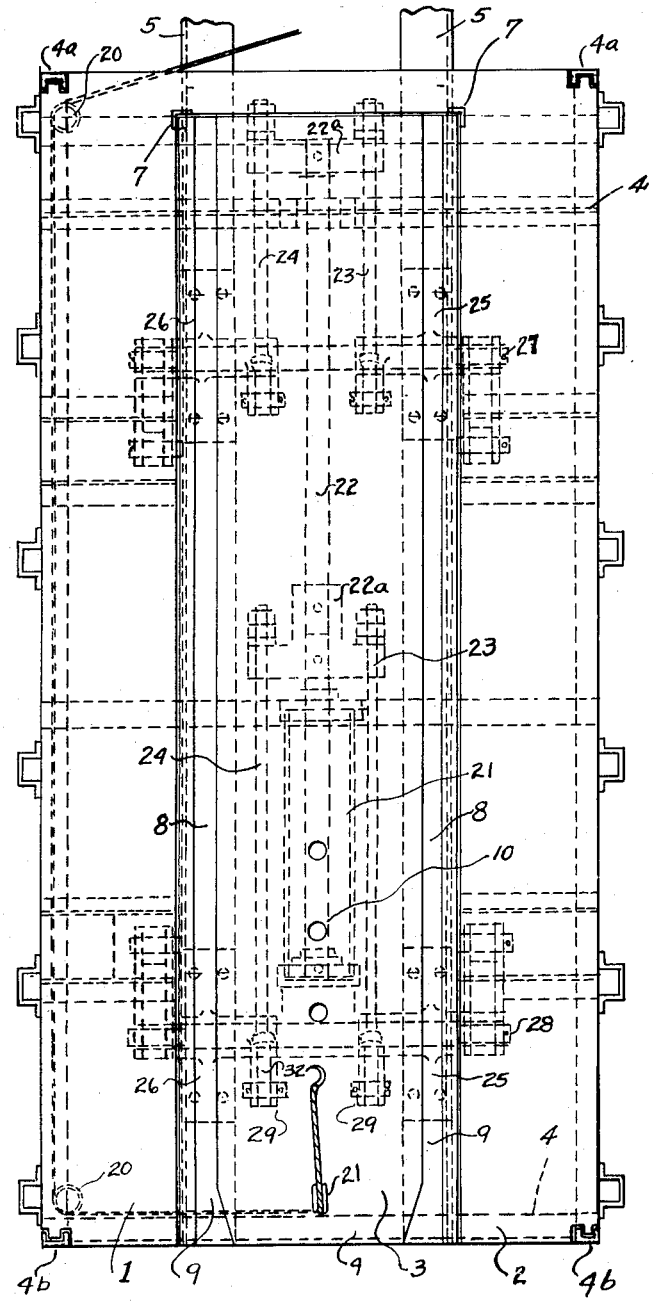
Figure 1 is a plan view of our truck body.

Broadly, in our invention we provide a truck or other platform carrier in which the floor is divided into three parts, the central section being movable with reference to the side sections, or the side sections movable with reference to the center sections. In use a load resting upon a small hand truck or the like is wheeled on to the center section of our truck. The load, where it does not of itself project so as to overlie a part of the side sections, is provided with underlying projecting elements sufficient to sustain its weight. When the load is in position we either lower the center platform of our truck or raise the side sections thereof, so as to lift the load from the hand truck, skid, dolly or the like, whereupon the hand truck or its equivalent is removed. The several sections of the platform of our truck are then lowered or raised into position as the case may be, forming a solid floor upon which the load rests for transportation. Unloading is of course accomplished by a reversal of these steps; and in this way, we achieve a device for transporting loads without disturbing the same, and we eliminate as respects the device of our invention any need for separate handling, stacking, assembly or the like. Hitherto when shipping sheet metal, for example, in a truck it has been the usual practice to transport the sheet metal to the truck where no crane is available and then to stack it thereon by hand, separately handling each sheet or piece. In some instances it has been proposed to bind a stack of sheets into a unitary load by suitable means and to transport this load to a truck or other platform carrier by means of mechanism comprising an elevating apparatus. This implies the use of binding means on the load itself, and is uneconomical, inasmuch as similar elevating mechanisms must be provided at each end of the trip, or the package must be broken and unloaded by hand. Quite clearly our device is particularly adapted for the shipment of assemblies of articles in a stack or the like, since such assemblies are ordinarily not susceptible to handling as a unitary heavy load would be by skidding upon rollers or the like.

In the type of truck construction in our examplary embodiment we have illustrated a motor truck embodying our invention. It will be understood that our invention is applicable to any type of platform carrier, such as, but without limitation, a freight car, and at that the embodiment described by us is exemplary and not limiting. We have shown in the several figures a truck in which the floor or platform is divided into side sections 1 and 2 and a central section 3. In this embodiment the central section is permanently in position upon the supporting structure of the truck and the side sections 1 and 2 may be raised with respect to it. This is the usual construction adopted by us because it provides means for carrying the load at as low a level as possible in transporting the same; and provides for the resting of the side sections during transportation directly upon the supporting structure. It would be feasible, however, to provide a truck in which the three sections are supportable at a higher level and in which the center section was provided with means for lowering it with respect to the side sections. Another advantage of the embodiment shown is, of course, that because the center section does not move it may be held always in alignment with a loading platform or the like.

We have shown supporting means forming the bed of the truck and comprising transverse members 4 suitably supported upon the longitudinal chassis members 5 which are mounted upon the truck springs. Our central section 3 is permanently affixed to these transverse supporting beams. At the rear of the truck we have shown vertical angle members 4b which serve as guideways for the vertical movement of the side platform sections 1 and 2. Similar angles at the front of the truck indicated at 4a are provided; and the head board 6 of the truck may be attached thereto. Where desired, supplementary guiding members 7 at the front end of the truck may serve to guide the inner ends of the platform sections 1 and 2. Guides for the inner ends are not provided at the rear of the truck for the reason that they would interfere with the loading thereof as will be readily understood.

We have shown a center section provided with run ways 8, bordered by angle iron members 9 or formed by channel irons, for the guiding of the wheels of a small hand truck where used; and the central portion between these run ways may be provided with holes 10 into which pins may be placed to prevent the longitudinal skidding of the load when it rests thereon. In the embodiment shown the hoisting part of our truck includes side members 11 and a top 12 which move as a unit and which make it possible for us in our apparatus to haul loads equal in height to the total clearance between the truck floor and the top of our truck.

It will be seen that when the small hand truck 13, with its wheels 14 engaging in the runways 8, is hauled on to the central portion of our truck bed from a loading platform or the like, which is preferably upon the same level, varying spring deflections will occur in the truck with varying loads, thus bringing the truck bed to different levels. In order to obviate the difficulty which this entails we have provided means to control the height of the back end of the truck exactly during loading, so that there need be no bumping of the load as it is placed upon the truck because of varied deflection of the springs under varying loads. To a platform member 16 attached to the rear axle, the spring mounting, or any other suitable support on a part of the truck, which support is maintained at a fixed distance from the ground, we place a jack 16b or the like. The form of the jack may vary as desired. We have illustrated a hydraulic jack having a main cylinder 14a, the piston 15a of which acts against a block 16a welded or otherwise fastened to one of the permanent structural members 5 of the truck bed. There will be in this type of truck a jack of this construction upon each side underlying a bearing upon each of the longitudinal chassis frame members 5. A common pump is provided for both jacks, or a separate pump as desired, with a common or a separate actuating means. We have shown a pump 18 having an operating handle 18a which is either made conveniently accessible to the operator or is connected for operation to a shaft common to the pump handles of both jacks, the shaft being provided with suitable operating means, accessible for example, to a man standing inside of the truck. The form of the operating means for these jacks is not controlling, but may be varied as desired for different uses. It will be understood, however, that by means of these jacks we may raise, lower, or fix the platform of our truck so as to coincide with a loading platform, and inasmuch as the jacks lift or hold the weight of the truck from the springs, the wheeling of a load on to the platform of our truck will not deflect the springs so as to bring our truck platform out of alignment with a loading platform.

Figure 2:
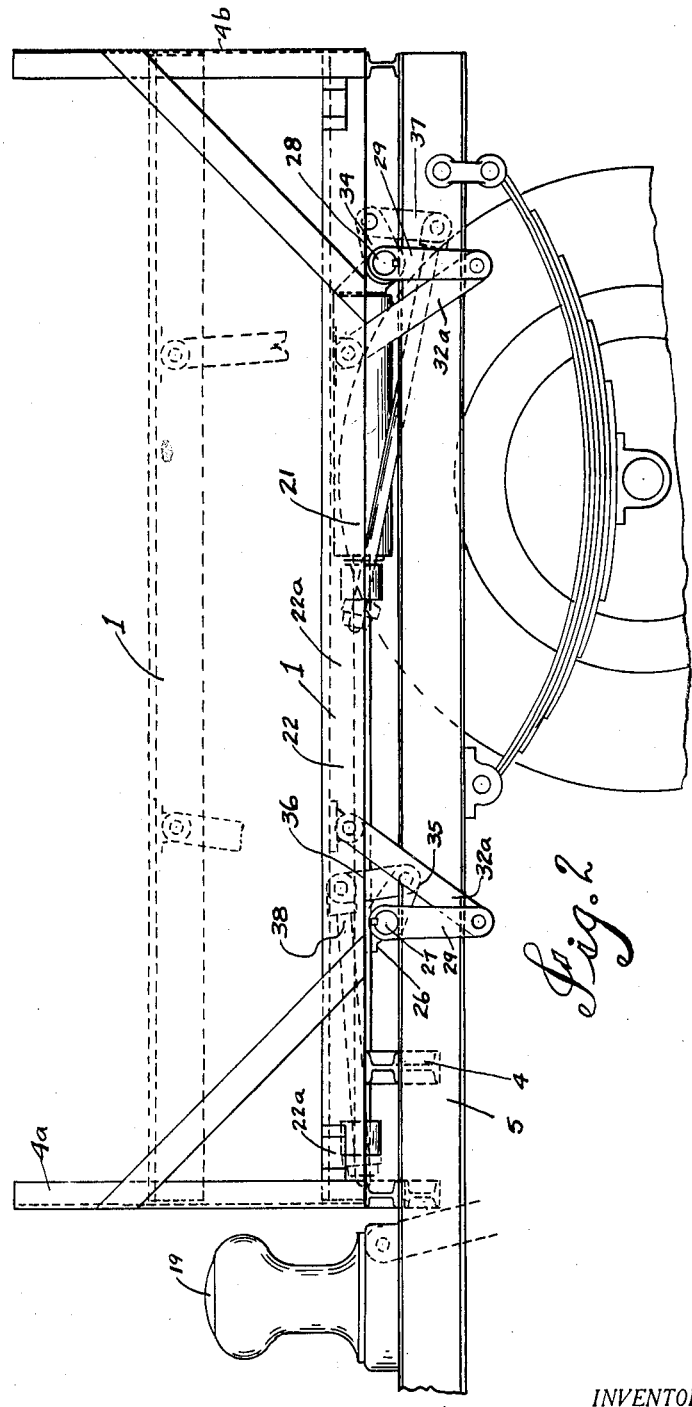
Figure 2 is a side elevation thereof showing the operating mechanism.
Figure 3:
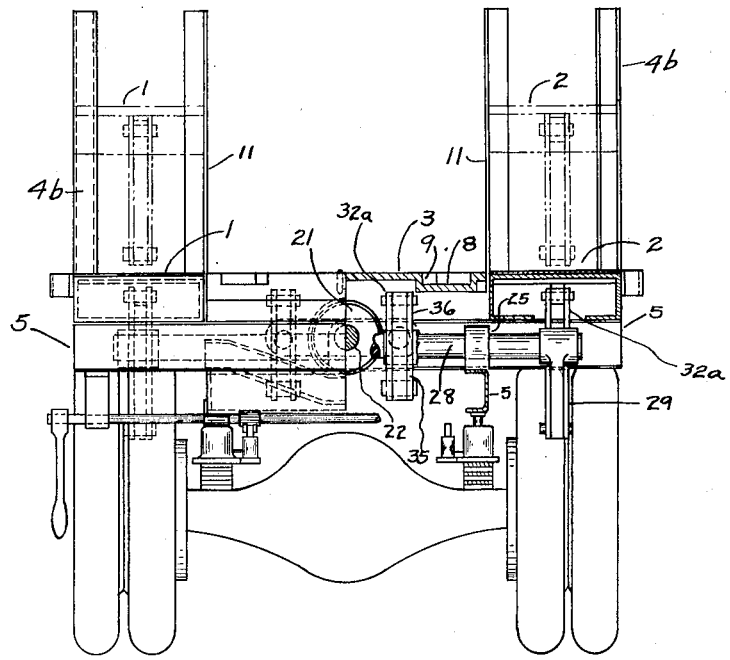
Figure 3 is a rear elevation.
Figure 6:
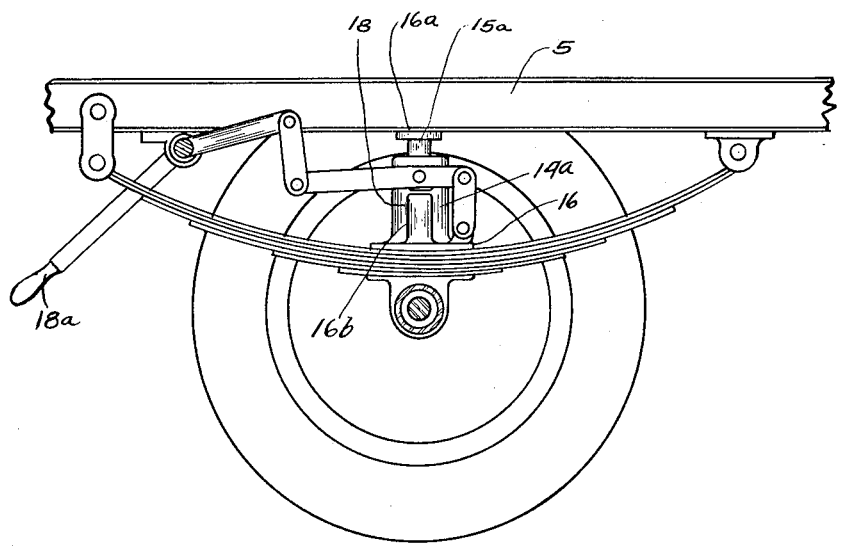
Figure 6 is a detail showing means whereby our truck body during loading and unloading may be maintained at the same height.
Figure 4:
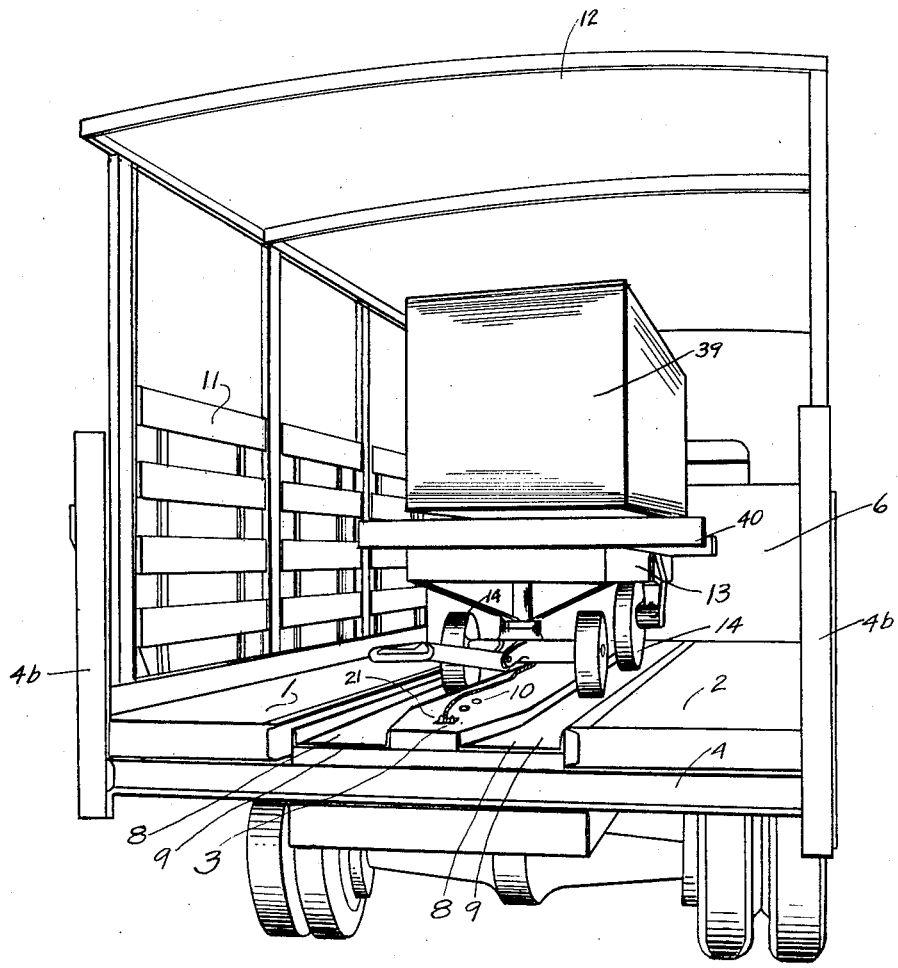
Figure 4 is a perspective view showing the truck in receiving or carrying position, a load of metallic sheets being indicated thereon.
Figure 5:
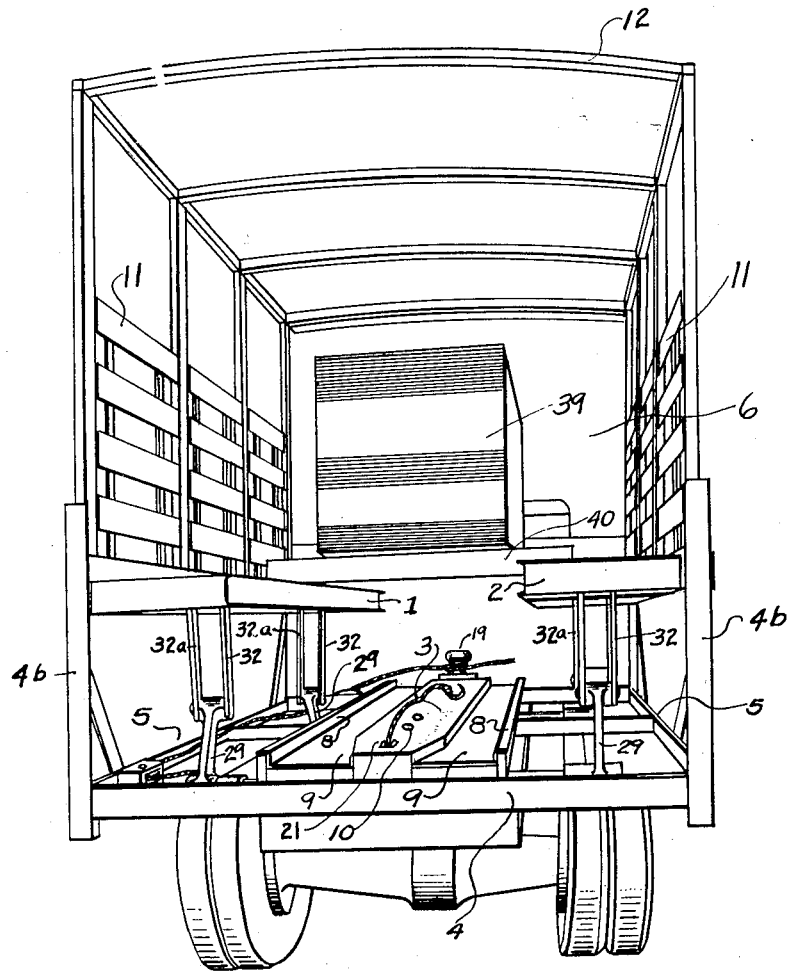
Figure 5 is a perspective view of our truck showing the single platform lowered, the load resting upon the side platforms and the preliminary or hand truck removed.

We may, and in many instances we do provide our truck with a winch which may be employed in pulling a load on or off the central platform thereof. This winch is illustrated at 19 in Figure 2, and it has a cable running over pulleys 20, so that only part of its overlies the central section of our truck platform and passes over a pulley 21 at the rear thereof, the other section returning beneath the central portion of our platform. Thus we may employ the winch for pulling a load on or off the truck.

Next we provide means for raising and lowering the side sections 1 and 2 of our truck in the guideways formed by the angles 4b and 4a. These means may also be varied by the use of a number of mechanical expedients, but in the exemplary illustration we have illustrated a hydraulic mechanism. We have shown permanently fastened to the truck bed a hydraulic cylinder 21 having a piston rod 22 to which two heads 22a are attached. These heads have means for connecting thereto, at opposite sides of the cylinder 21, pull rods 23 and 24 respectively. We provide, at interspaced points beneath our truck, journal bearings 25 and 26 for shafts 27 and 28, to which shafts we fix levers 29. The sliding side sections 1 and 2 of our truck bottom have bearing blocks 30 and 31 at interspaced points, which bearing blocks are connected with the levers 29 by pivoted links 32 and 32a. It will be seen that as shaft 27 rotates in a counter clockwise direction, and shaft 28 rotates in a clockwise direction, the action of the levers 29 and the links 32 and 32a will be to raise the side sections of the truck platform as shown in dotted lines in Figure 2. We have found it advantageous to cause our shafts to rotate in opposite directions during the hoisting operation, so that the longitudinal thrusts upon the moving platform sections will oppose rather than reinforce each other, and so that the platform may be raised without undue end thrust.

Next we provide means whereby the pull rods 23 will rotate the shafts 27 and 28, in the said directions, as the piston rod 22 of the hydraulic cylinder is actuated. We have employed for this purpose standard linkages comprising lever arms 34 and 35 upon the shafts and links 36 and 37 pivoted to the lever arms, and the pull rods. These links are provided with abutments 38 engaging the lever arms so as to cause them to rotate, as will be readily understood. Other means may be taken to actuate the elevating mechanism, such as a pair of shafts provided upon opposite ends with right and left hand threads respectively which engage nuts adapted through suitable linkages to raise and lower the platform sections.

In the operation of our mechanism we wheel a hand truck 13, for example, bearing a load 39 of stacked sheets or the like, upon the central platform section of our truck, having first fixed this platform section at the height of the loading platform by means of the jack mechanism hereinbefore described. Where the load 39 projects sufficiently to be engaged by the side sections 1 and 2 of our truck platform we may merely lift it off, as will be presently explained. Where, however, the load is likely to sag or where it is not wider than the space between the elevating sections of our truck platform, we prefer to form it by first placing I beams 40 upon the hand truck and then stacking the sheets or other articles forming the load 39 upon the I beams, the beams being long enough to project over the elevating side sections of our truck platform. The hand truck, as shown, will not be wider than the central stationary platform of our truck, so as not to be caught by the side sections as they are elevated. The guideways 15 on our central platform section will serve to retain the hand truck centrally thereof so that it will not interfere with the elevating of the side sections. When the hand truck has been brought into position, using the winch 19 if necessary, the platform sections 1 and 2 of our truck are then elevated. In the specific embodiment shown, where the elevating platform sections is accomplished by hydraulic means, it will be understood that the engine of the truck is equipped with a hydraulic pump feeding the cylinder 14a and that suitable controls therefor are provided as will be readily understood. A hand pump may of course be provided, or a pump provided with a separate prime mover. Where other mechanical means are taken to elevate the side sections of the truck, suitable actuating means therefor will be provided. As the side sections 1 and 2 of the truck platform are raised they engage either the load or the beams 40 and lift the load sufficiently to clear the hand truck, which is thereupon drawn out rearwardly again. When the hand truck has been removed the side sections of our elevated truck are lowered until the load rests either directly upon beams 40, or on the side sections 1 and 2 of the truck, which now rest upon the bed thereof and the center section.

Upon unloading, our truck is brought into position adjacent a loading or unloading platform and the bed thereof locked so that our truck platform will be in alignment with the loading or unloading platform. Thereupon the side sections 1 and 2 of our truck are raised until sufficient clearance is left between the load as supported by the side sections 1 and 2 and the center section 3 of our truck. Thereupon a hand truck is wheeled on to the center section beneath the load, and the side sections are lowered sufficiently to permit the load to rest upon the hand truck, by means of which it is now removed.

Various modifications may be made in our invention without departing from the spirit thereof.

Having thus described our invention, what we claim as new and desire to secure by Letters Patent, is:—

1. In a vehicle for transporting materials that are handled by temporary carriers, a supporting platform comprising a middle fixed section and outer elevatable sections, said middle section arranged to receive a temporary carrier and said outer sections arranged to be elevated and thereby lift a load from said temporary carrier, permitting withdrawal of said carrier, and means for elevating said outer sections.

2. In a vehicle for transporting materials that are handled by temporary carriers, a supporting platform comprising a central fixed section and outer elevatable sections, said central section arranged to receive a temporary carrier and said outer sections arranged to engage a load thereon and lift it from said temporary carrier, permitting withdrawal of said carrier, and means for elevating said outer sections, and means for fixing said central section at a desired height.

3. In a vehicle for transporting materials that are loaded on temporary carriers, a chassis, a supporting platform divided in sections, one of said sections being fixed with relation to said chassis of said vehicle, the other sections of said supporting platform being movable with relation to said chassis, elevating means to raise the movable sections to bring them in contact with the materials on the temporary carrier and remove them from said carrier, and to return the material to the level of said fixed section of said supporting platform, and guideways for said temporary carrier on said fixed section.

4. In a vehicle, a chassis, a body portion divided into movable and fixed sections, elevating means for the movable sections of said body portion, said fixed section being located between the movable sections and the movable sections being adapted to raise and lower materials carried in said truck body to facilitate loading and unloading, said elevating means comprising a hydraulic cylinder and linkages to said movable sections.

5. In a vehicle, a bed comprising a surface to receive another vehicle, and means alongside said surface, comprised in said bed, to rise and fall relatively to the received vehicle for raising a load from the received vehicle and permitting the received vehicle to be withdrawn and then lowering the load onto said bed.

6. In a vehicle, a bed comprising a middle surface to receive another vehicle, and devices at the opposite sides of said surface, comprised in said bed, to rise and fall relatively to the received vehicle for raising a load from the received vehicle and permitting the received vehicle to be withdrawn and then lowering the load onto said bed.

7. In a vehicle, a bed comprising a surface to receive another vehicle, running gear for the vehicle and spring mountings for the bed on the running gear, means for fixing said bed relatively to its running gear, inhibiting the action of the springs, to hold the bed surface in position for running another vehicle onto said surface from another surface, and means alongside said bed surface, comprised in said bed, to rise and fall relatively to the received vehicle for raising a load from the received vehicle and permitting the received vehicle to be withdrawn and then lowering the load onto said bed.

8. In a vehicle, a bed comprising a surface to receive another vehicle, means alongside said surface, comprised in said bed, to rise and fall relatively to said surface for raising a load from or lowering a load onto said received vehicle, and guiding means on said surface to guide the received vehicle into a proper position relative to said rising and falling means for reception of the load from or deposit of the load upon said received vehicle by said rising and falling means.

9. In a vehicle, a bed comprising a surface to receive another vehicle and comprising rising and falling means alongside said surface to raise a load from or lower a load to said received vehicle, an operating device, and lever and link connections from said operating device to said rising and falling means to cause the rise and fall of said means.

10. In a vehicle, a bed comprising a surface to receive another vehicle and comprising raising and lowering means adjacent to said surface to raise a load from or lower a load to the received vehicle, an operating device, a support for said device on the vehicle, levers fulcrumed on the vehicle, links connecting the respective levers to said raising and lowering means, and links connecting the respective levers to said operating device.

11. In a vehicle, a bed comprising a surface to receive another vehicle and comprising raising and lowering means adjacent to said surface to raise a load from or lower a load to the received vehicle, an operating device, a support for said device on said vehicle, levers fulcrumed on the vehicle and links connecting the respective levers to said raising and lowering means inversely to each other whereby the levers swing in opposite directions, either for raising or lowering said means, and means operatively connecting said levers with said operating device whereby said device swings said levers in their inverse directions, said levers, when holding said raising and lowering means in its raised position being adapted, by virtue of their different directions of operative swinging, to brace said raising and lowering means so that its gravitational action on one lever is counteracted by an oppositely swinging lever.

12. In a vehicle, a bed comprising sections alongside each other, and supporting means for the respective sections, one supporting means operatable to raise or lower one section relatively to the other, whereby the sections may jointly support a load or one section may permit a temporary carrier to travel thereon under the load and another section may impose the load upon the carrier or relieve the carrier of the load, said bed being open at adjacent sides of the sections to permit the load to be carried by the carrier horizontally inward or outward over the sections.

13. In a vehicle, a bed comprising three sections alongside each other, the two outer sections mounted as a unit and the middle section mounted as a second unit, and supporting means for the respective units, one supporting means operatable to raise or lower one unit relatively to the other, whereby the three sections may jointly support a load or the middle section may permit a temporary carrier to travel thereon under the load and the outer sections may impose the load upon the carrier or relieve the carrier of the load, said bed being open at adjacent sides of the three sections to permit the load to be carried by the carrier horizontally inward or outward over the three sections.

14. In a vehicle, a bed comprising sections alongside each other, and supporting means for the respective sections, one supporting means operatable to raise or lower one section relatively to the other, whereby the sections may jointly support a load or one section may permit a temporary carrier to travel thereon under the load and another section may impose the load upon the carrier or relieve the carrier of the load, said bed being open at adjacent sides of the sections to permit the load to be carried by the carrier horizontally inward or outward over the sections, said one section having means for guiding said carrier in its travel thereon to prevent its engagement with the other section when the relative elevation of the sections is changed.

15. In a vehicle, a bed comprising a middle section and side sections movable up and down relatively to the middle section, and a structure comprising side walls and a roof mounted upon and movable up and down with the side sections, said structure being open at adjacent ends of the three sections to permit a load to be carried horizontally inwardly or outwardly over the three sections.

16. In a vehicle, a bed comprising a middle section and side sections movable up and down relatively to the middle section, and a structure comprising side walls mounted upon and movable up and down with the side sections, said structure being open at adjacent ends of the three sections to permit a load to be carried horizontally inwardly or outwardly over the three sections, and said middle section having means to guide a temporary carrier to prevent collision of the carrier with the side sections and collision of the load, carried by said carrier, with the side walls.

TERRENCE W. ALLSWORTH.
HARVEY ABBOTT.
LAWRENCE BRUDER.